July 21, 1959 G. P. COPPING ET AL 2,895,610
SEGREGATING APPARATUS
Filed June 3, 1957
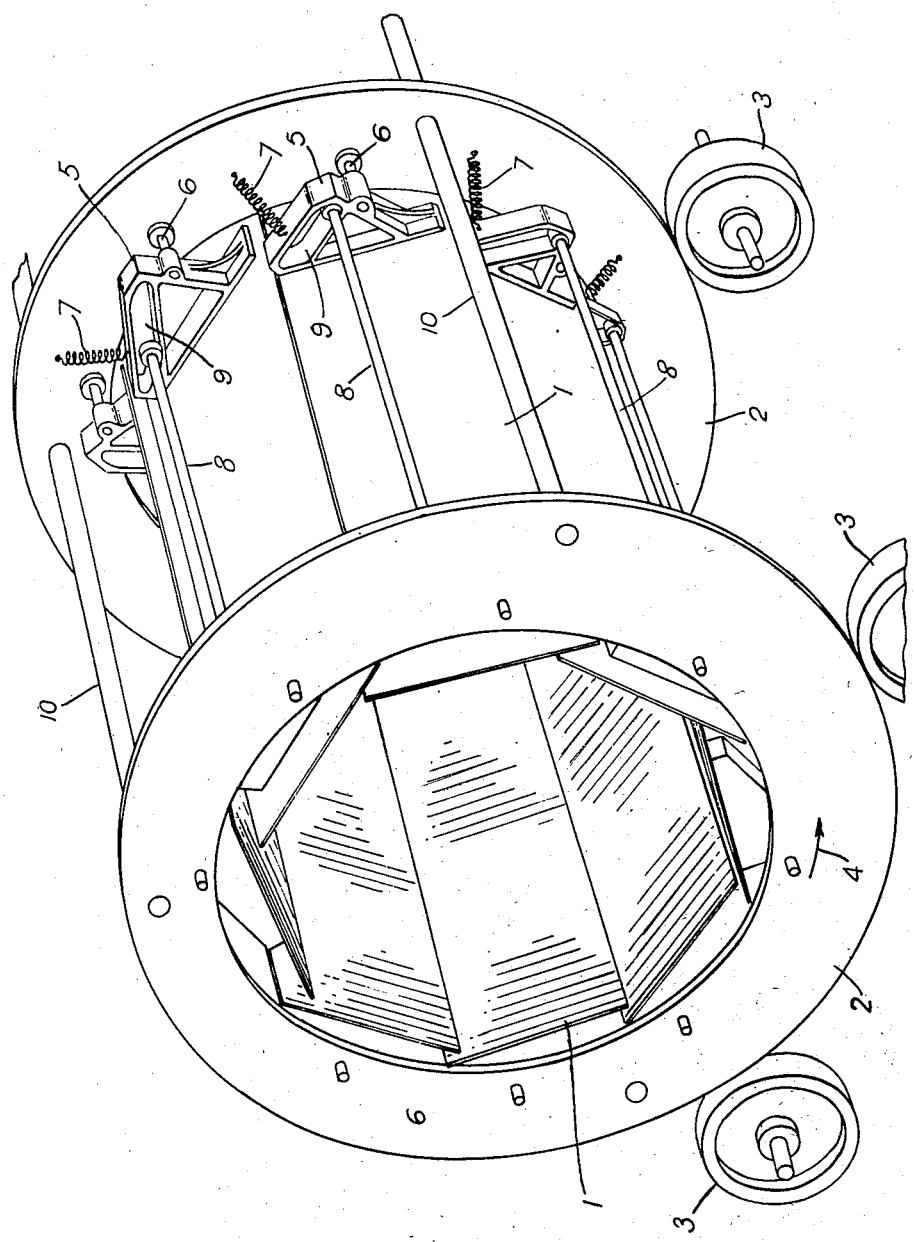
GEOFFREY P. COPPING,
THOMAS R. MYERS, & GILBERT H. SMITH,
INVENTORS
BY Hall & Houghton
ATTORNEY

United States Patent Office 2,895,610
Patented July 21, 1959

2,895,610

SEGREGATING APPARATUS

Geoffrey Percy Copping, Chesham, Thomas Roland Myers, Wembley Park, and Gilbert Harold Smith, Purley, England, assignors to Her Majesty's Postmaster General, London, England Application June 3, 1957, Serial No. 663,025

Claims priority, application Great Britain June 4, 1956

4 Claims. (Cl. 209—98)

The present invention relates to segregating apparatus more particularly for segregating from a quantity of differently sized articles those articles having at least one dimension less than a predetermined dimension.

According to the invention, a segregating apparatus for segregating from a quantity of differently sized articles those articles having at least one dimension less than a predetermined dimension comprises a drum shaped receptacle supported for rotation about its axis so that upon rotation of the drum the wall thereof provides an upwardly moving surface, elongated apertures in the said wall extending transversely to the direction of movement thereof, the said apertures having a width corresponding to the said predetermined dimension, and an opening in one end of the drum for delivering the articles into the drum whereby as the drum rotates the articles are caused to travel upwardly with the said upwardly moving surface and articles having at least one dimension less than the width of the apertures are discharged through the apertures and the remaining articles fall back to the lowermost portion of the said upwardly moving surface.

Conveniently the wall of the drum shaped receptacle is formed of a plurality of overlapping wall sections extending axially of the drum and each pivotally supported for angular displacement about an axis extending in the axial direction of the drum to permit the spacing of overlapping portions of adjacent sections to be varied, and there is provided a means for angularly displacing the wall sections as the drum rotates, so that as the wall sections move upwardly from the lowermost position the spacing of the overlapping portions of the wall sections is maintained substantially constant and equal to the said predetermined dimension and when the wall sections approach their uppermost position the spacing is increased.

Thus any articles which may become lodged in the slots formed by overlapping portions of adjacent sections will be released when the slots are increased in width as the wall sections approach their uppermost position and will fall again to the bottom of the drum. The drum rotates until all the articles have been segregated, after which the articles which have not passed through the slots can be removed from the drum.

In order to provide for continuous operation the drum is open at the other end and is supported so that its axis extends downwardly in the direction of said other end. In this manner as the drum rotates the articles which are not discharged through the slots will travel towards the other end and be discharged therefrom, and a suitable conveying means, such as a belt conveyor disposed beneath the drum, can be provided for continuously removing the articles discharged through the slots.

The invention will now be described wtih reference to the accompanying drawing in which the sole figure illustrates somewhat diagrammatically one form of segregating apparatus according to the invention.

The apparatus shown in the drawing comprises an elongated hollow cylindrical container or drum adapted to receive the articles from which those articles having at least one dimension less than a predetermined dimension are to be segregated. The peripheral wall of the drum is formed by a plurality of elongated sheet metal members or flaps 1, extending longitudinally of the drum and pivotally supported in a manner hereinafter described, upon rings 2 spaced longitudinally of the drum, only two of which are shown in the drawing. The rings 2 are supported upon rollers 3 disposed so that the axis of the drum is inclined slightly downwardly towards one end thereof. An electric motor (not shown) is drivingly connected to some or all of the rollers 3 in order to rotate the drum in the direction of the arrow 4. The flaps 1 are arranged with their adjacent longitudinal edge portions overlapping and spaced one from the other to provide elongated apertures in the form of slots extending longitudinally of the drum, and normally having a width equal to the said predetermined dimension. Each flap is supported between adjacent rings 2 by a pair of brackets 5, which brackets are pivoted upon spindles 6 secured in the ring 2. Each flap 1 is thus supported for pivotal movement about an axis extending longitudnally of the drum and is lightly spring loaded by means of springs 7 connecting each bracket 5 forwardly of the pivot 6 in (in the direction of rotation of the drum) to the corresponding ring 2, so that the flap is caused to pivot in a clockwise direction, as viewed in the figure, into engagement with stop means (not shown) which cause the overlapping edge portions of adjacent flaps to be spaced the required minimum distance to give a slot having the desired width.

The pivotal axis of the brackets 5 is spaced rearwardly from the longitudinal axis of the flap so that the flap is weight biased by the weight of the brackets forwardly of the pivot 6 to rotate in an anti-clockwise direction when the flap travels upwardly from the horizontal diameter of the drum, and when the flap approaches the uppermost position the weight bias is sufficient to overcome the light spring loading of the springs 7 and the flap rotates anti-clockwise to increase the spacing between overlapping edge portions, thereby to release any articles that may have become lodged in the slots.

In order to ensure positive action of the flaps, weighted bars 8 extend between the brackets of each flap and are slidably supported in slots 9 in the brackets so that when a flap reaches a position in which the slots 9 of the brackets supporting the flap incline downwardly in the direction of movement of the drum, the weighted bar 8 slides forwardly of the brackets to overcome the resistance of the springs 7 and cause the flap to rotate to open the slot. The weighted bar 8 will remain at the forward end of the slots 9 as the flap moves downwardly towards its lowermost position and after the flap has passed the horizontal diameter of the drum in the said downward movement the weight of the bar 8 will assist the spring 7 and cause the flap to rotate clockwise to close the slot to the minimum width.

The rings 2 are rigidly secured on spacer rods 10 and the length of the flaps and the disposition of the rings can be chosen to suit the quantity of articles to be handled by the apparatus.

The apparatus is specially suitable for handling letters and other like postal packets prior to passing the letters to facing or sorting machines, so that letters or packets of a thickness unsuitable for such machines are segregated and discharged through the open end of the drum. Suitable deflector plates (not shown) are provided for guiding the letters which drop through the slots, on to an endless band conveyor (also not shown) positioned beneath the drum and which conveys the letters to further mail handling apparatus, for example letter facing or sorting apparatus. The longitudinal edges of the flaps which overlie the adjacent flaps are preferably bent so as to lie substantially parallel to the under flap, thereby to provide parallel sided slots. In one example of apparatus for handling mail, the drum approximately 4 feet in diameter and 16 feet long, is formed of eight flaps of 1 foot in width, and adapted to provide a slot of ⅜" width when the flaps are in their lowermost position and of 2" width when the flaps reach their uppermost position. The inclination of the drum is between 5° and 10° to the horizontal and the drum is rotated at approximately 8 r.p.m. The length of the drum will of course depend on the amount of mail to be handled so that for a small quantity of mail the drum may be of a length comprised between two rings 2 which may be considered as forming one section and for greater quantities of mail the number of sections would be correspondingly increased. It will be understood that the invention is not limited to the above described construction. For example other means such as a stationary cam surface surrounding the drum and engaged by cam followers secured to the flaps may be employed to impart the desired pivoting movement of the flaps as the drum rotates.

We claim:

1. Segregating apparatus for segregating from a quantity of items of postal mail, letters and other like postal packets of less than a predetermined thickness, the said apparatus comprising an elongated drum formed by ring members, spacer members extending between and securing said ring members in co-axial relation and axially spaced, and a plurality of elongated flaps extending between the said ring members in edgewise overlapping relation and forming the peripheral wall of the drum; rollers engaging the edge surface of said ring members to support the drum with the axis thereof inclined downwardly from one ring member to the other and drive means for rotating said rollers thereby to rotate the drum in a given direction, the said drum further comprising means pivotally mounting each flap at its ends in the said ring members and stop means limiting the pivoting of the flaps in one direction to a position in which the overlapping marginal edge of one flap is spaced from the adjacent marginal edge of the immediately preceding flap in the direction of rotation of the drum a distance equal to the said predetermined thickness thereby to provide metering slots extending lengthwise of the drum and through which letters and like postal packets introduced through the said one ring member and having a thickness less than said predetermined thickness are discharged upon rotation of the drum, the said pivotal mounting means including brackets secured to the flaps and spindles pivotally supporting the brackets on the ring members so that the pivotal axis of each bracket is spaced rearwardly with respect to the direction of rotation of the drum from the longitudinal axis of the flap to which it is secured, whereby the flaps are weight-biased by the weight of the brackets forwardly of the said spindles to urge the flaps into engagement with the said stop means as the flaps move downwardly and then upwardly from one side to the other of the horizontal diameter of the drum, and to urge the flaps away from the said stop means as the flaps move upwardly from said horizontal diameter, whereby as the flaps approach their uppermost position the spacing of the overlapping marginal edges is increased to release any articles which may have become lodged in the metering slots.

2. Segregating apparatus as claimed in claim 1, further comprising a weighted member associated with each of said brackets and means supporting said weighted member on the bracket for movement transversely of the flap from a first position in which the weighted member assists the said weight-biasing of the flap into engagement with the stop means to a second position in which the weighted member assists the weight-biasing of the flap away from the stop means, the said movement of the weighted member being effected by gravity as the flap is carried round by the ring members.

3. Segregating apparatus as claimed in claim 2, comprising two said brackets supporting each flap and spaced lengthwise thereof, a weighted bar constituting said weighted member extending between and engaging said brackets, and means on each bracket supporting the engaging end of the bar for sliding movement from said first position to said second position.

4. Segregating apparatus for segregating from a quantity of items of postal mail, letters and other like postal packets of less than a predetermined thickness, the said apparatus comprising an elongated drum formed by ring members, spacer members extending between and securing said ring members in co-axial relation and axially spaced, and a plurality of elongated flaps extending between the said ring members in edgewise over-lapping relation and forming the peripheral wall of the drum; rollers engaging the edge surface of said ring members to support the drum with the axis thereof inclined downwardly from one ring member to the other and drive means for rotating said rollers thereby to rotate the drum in a given direction, the said drum further comprising means pivotally mounting each flap at its ends in the said ring members and stop means limiting the pivoting of the flaps in one direction to a position in which the overlapping marginal edge of one flap is spaced from the adjacent marginal edge of the immediately preceding flap in the direction of rotation of the drum a distance equal to the said predetermined thickness thereby to provide metering slots extending lengthwise of the drum and through which letters and like postal packets introduced through the said one ring member and having a thickness less than said predetermined thickness are discharged upon rotation of the drum, and means supported by the said flap mounting means for weight biasing each flap for pivotal movement in said one direction into engagement with the said stop means as the flaps move downwardly and then upwardly from one side to the other of the horizontal diameter of the drum, and to urge the flaps away from the said stop means as the flaps move upwardly from said horizontal diameter, whereby as the flaps approach their uppermost position the spacing of the overlapping marginal edges is increased to release any articles which may have become lodged in the metering slots.

References Cited in the file of this patent

UNITED STATES PATENTS

| | | |
|---|---|---|
| 645,450 | Bohannan | Mar. 13, 1900 |
| 1,472,279 | Nordstrom | Oct. 30, 1923 |
| 1,832,035 | Lieb | Nov. 17, 1931 |
| 1,874,391 | Urschel | Aug. 31, 1932 |
| 2,687,801 | Jackson | Aug. 31, 1954 |